Jan. 25, 1944.                J. MOORE ET AL                2,340,011
                              BATTERY TERMINAL
                              Filed Feb. 5, 1943

JACK MOORE,
GASTON B. KILLAM,
                INVENTORS,

BY *Martin E. Anderson*
                attorney

Patented Jan. 25, 1944

2,340,011

UNITED STATES PATENT OFFICE 2,340,011

BATTERY TERMINAL

Jack Moore and Gaston B. Killam,
Denver, Colo.

Application February 5, 1943, Serial No. 474,893

1 Claim. (Cl. 173—259)

This invention relates to improvements in storage battery terminal connectors and has reference more particularly to that type of connector which is employed in connection with the storage batteries used on automotive vehicles.

Storage batteries employ an acid electrolyte and in spite of elaborate precautions calculated to prevent acid from coming in contact with the exposed terminals and the connectors, the acid will come in contact therewith and as a result corrosion takes place which, in addition to being very detrimental to the connectors, also makes it difficult to remove the connectors from the battery terminal posts.

In order to facilitate the application and removal of the battery terminal connectors in spite of the corrosion, a large number of different types of connectors have been designed and patented.

It is the object of this invention to produce a battery terminal connector of a simple and substantial construction that can be manufactured at a comparatively low cost and which can be readily applied to the end of a battery cable and to a battery terminal post.

Another object of the invention is to produce a battery terminal connector of such construction that it can readily be released and removed from the battery terminals and from the battery cable.

The above and any other objects that may become apparent as the description proceeds are attained by means of a construction and an arrangement of parts that will now be described in detail and for this purpose reference will be had to the accompanying drawing in which the invention has been illustrated, and in which:

Figure 3 is a top plan view, partly in section, showing the connector, the parts being shown in inoperative position; and Figure 4 is a top plan view of the connector and shows the same connected to a battery terminal and to a cable.

Figure 1:
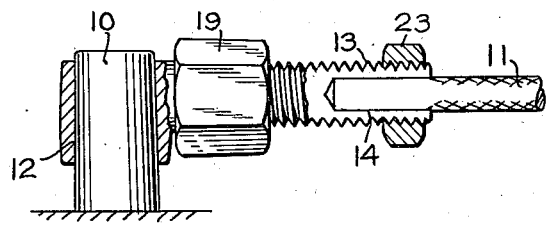
Figure 1 is a side elevation of the connector shown in Figure 3, a portion of the stem being broken away and one nut shown in section.
Figure 2:
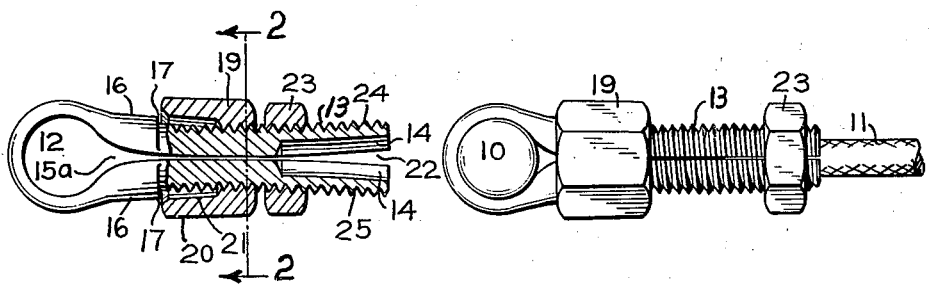
Figure 2 is a transverse section taken on line 2—2, Figure 3.
Figure 2:
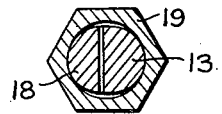

In the drawing reference numeral 10 designates a battery terminal post, which in the usual type of batteries is slightly tapering, and reference numeral 11 designates a cable by means of which electricity is conducted from the battery terminal to any mechanism or control device desired.

The connector, by means of which an electric connection is established between the terminal 10 and the cable 11, is formed from a metal body having one end provided with a substantially circular loop 12 from which a threaded stem 13 projects. The stem is provided with an axial opening 14 for the reception of an end of the cable. The opening formed by loop 12 is of such size that when it is in the open position shown in Figure 3, it can be readily passed over the battery terminal 10 and when in the closed position shown in Figure 4, it will firmly engage the wall of the battery terminal in the manner shown in Figure 1.

The terminal is formed from a semi-cylindrical piece of metal which is bent intermediate its ends to form a loop 12 for the reception of the terminal post 10. The stem 13 is threaded, as indicated in the drawing, and that part of the terminal adjacent the loop 12 and which has been indicated by reference numeral 16, terminates in an outwardly tapering frusto-conical surface which, in turn, terminates in shoulder 17. A nut 19 is applied to the threaded stem and this is provided with a flange 20 whose inner surface is outwardly flaring as indicated by reference character 21. When the nut is turned towards the left, the inner surface of the flange overlaps the surface 16 and serves to force the two parts of the stem together whereupon the area of the loop 12 diminishes and when the terminal is in place on the battery terminal post 10, it becomes firmly clamped to the latter. After the nut 19 has been applied to the threaded stem, another and smaller nut 23 is then threaded onto the stem. The two nuts are moved as far as possible towards the left and thereupon the two parts of the stem are spread apart by a suitable tool, leaving a wedge-like space 22 as shown in Figure 3. Before the stem is spread a socket 14 is provided for the reception of the end of the battery cable. In the drawing the two opposed inner surfaces of the stem have been shown slightly spaced, but in actual construction this space is very small and has been shown in the drawing mostly to facilitate a clear delineation of the article. After the stem has been spread in the manner indicated and shown in Figure 3, and before it is applied to the battery terminal 10, the nuts are both turned towards the right as far as they will go. When nut 23 is moved towards the right, it forces the two end portions of the stem towards each other and this, in turn, produces a force which spreads the ends adjacent the loop 12 and increases the width of the slot 15a which provides an increased area for the loop so as to facilitate the insertion of the battery terminal and which also produces a better grip on the terminal after the nut 20 has been moved towards the left into the position shown in Figures 1 and 4. After the terminal has been attached to the battery terminal, nut 23 is then turned towards the left, whereupon the ends 24 and 25 spread apart and when the parts are in this position the end of the battery cable can be inserted, after which nut 23 is turned so as to move it towards the right into the position shown in Figures 1 and 4.

Particular attention is called to the lever-like action due to the convex adjacent surfaces of the stem as this spreading apart of the stem adjacent the loop and the widening of the gap 15a makes it possible to effect a more ready application and a better electrical connection and besides this when the terminal is to be removed, it can be broken loose from the battery terminal by moving the nut 19 as far to the right as it can go, whereupon the strains present in the stem parts function to open the loop slightly, thereby breaking any adhesive bond that may have formed due to the corrosive action of the electrolite.

Since the connector is to be employed in places where it is subjected to the action of strong acids, such as sulphuric acid, it must either be made of an acid resisting metal, or have a coating of such metal, and for articles of this kind it is customary to provide a lead coating, and, although this has not been shown in the drawing, it is to be understood that the usual lead coating can be employed if desired.

Although primarily intended for effecting an electrical connection with a storage battery terminal post, it is, of course, quite possible that connectors of this type may find other and similar uses and the invention is therefore not to be understood as limited to any particular use.

When connectors like the one above shown and described are employed in connection with storage batteries, they can be quite readily disconnected and removed because the nut 20 is in such a position that it can be engaged by a suitable wrench and rotated so as to move it towards the left, whereupon the normal resiliency of the metal employed will cause the loop to expand, thereby releasing its hold on the battery terminal. If the corrosion should be sufficient to prevent the connector from automatically releasing, a screwdriver, or similar tool, can be inserted in slot 15, Figure 1, or in the corresponding slot 15a in Figure 6 and the parts spread sufficiently to effect a release.

Having described the invention, what is claimed as new is:

A battery terminal connector comprising a metal member bent double and provided with a loop at one end, the ends projecting from the loop to form a split stem being substantially semi-circular and provided with threads on their outer surface, and with complementary sockets in their inner surface, the projecting ends being longitudinally convex on their inner surfaces and longitudinally concave on their outer surfaces, two nuts encircling and threadedly connected with the stem, the nut nearest the loop when moved into engagement with the outer surface of the loop wall serving to reduce the area enclosed thereby and effect a clamping action on a battery terminal post, the nut farthest from the loop when turned so as to move towards the end of the stem serving to move the two parts together to clamp a cable therebetween.

JACK MOORE.
GASTON B. KILLAM.